(12) United States Patent
Shvodian (10) Patent No.: US 6,885,637 B1
(45) Date of Patent: Apr. 26, 2005

(54) DISTRIBUTED DETERMINATION OF EXPLICIT RATE IN AN ATM COMMUNICATION SYSTEM

(75) Inventor: William M. Shvodian, McLean, VA (US)

(73) Assignee: Bae Systems Information and Electronic Systems Integration, Inc., Nashua, NH (US)

( * ) Notice: Subject to any disclaimer, the term of this patent is extended or adjusted under 35 U.S.C. 154(b) by 0 days.

(21) Appl. No.: 09/570,050

(22) Filed: May 12, 2000

Related U.S. Application Data (60) Provisional application No. 60/160,302, filed on Oct. 19, 1999, and provisional application No. 60/137,595, filed on Jun. 3, 1999.

(51) Int. Cl.$^7$ ............................... H04J 1/16; H04J 3/14
(52) U.S. Cl. .................... 370/229; 370/316; 370/395.1; 370/396
(58) Field of Search ................................ 370/229, 232, 370/236, 234, 230.1, 230, 235, 236.1, 310, 310.1, 310.2, 315, 316, 323, 395.1, 395.21, 395.4, 395.41, 395.42, 395.43, 395.2, 396, 397

(56) References Cited

U.S. PATENT DOCUMENTS

| | | |
|---|---|---|
| 4,455,651 A | 6/1984 | Baran |
| 5,408,237 A | 4/1995 | Patterson et al. |
| 5,528,593 A | 6/1996 | English et al. |
| 5,590,395 A | 12/1996 | Diekelman |
| 5,633,859 A | 5/1997 | Jain et al. |
| 5,675,576 A * | 10/1997 | Kalampoukas et al. ..... 370/232 |
| 5,737,313 A * | 4/1998 | Kolarov et al. ............. 370/234 |
| 5,805,577 A * | 9/1998 | Jain et al. .................... 370/234 |
| 5,909,443 A * | 6/1999 | Fichou et al. ............... 370/412 |
| 5,946,324 A * | 8/1999 | Mishra et al. .............. 370/468 |
| 5,991,268 A * | 11/1999 | Awdeh et al. ............ 370/236.1 |
| 6,069,872 A * | 5/2000 | Bonomi et al. ............. 370/236 |
| 6,377,550 B1 * | 4/2002 | Prasad ..................... 370/236.1 |
| 6,445,707 B1 * | 9/2002 | Iuoras et al. ........... 370/395.43 |

* cited by examiner

Primary Examiner—Ajit Patel
(74) Attorney, Agent, or Firm—Swidler Berlin Shereff Friedman, LLP (57) ABSTRACT

In an ATM satellite communication system, congestion parameters for the downlink from the satellite are measured in the satellite and are broadcast to the downlink terminals or to the downlink and uplink terminals linked by virtual channels extending through the satellite. At a downlink terminal or uplink terminal, the parameters broadcast from the satellite are used to calculate an explicit rate for a virtual channel in the downlink. The explicit rate calculated at the terminal is used by the source for the virtual channel to determine the rate of transmission of Available Bit Rate cells on the virtual channel.

38 Claims, 6 Drawing Sheets

DISTRIBUTED DETERMINATION OF EXPLICIT RATE IN AN ATM COMMUNICATION SYSTEM

This invention claims the benefit of provisional application No. 60/160,302, filed Oct. 19, 1999, and provisional application No. 60/137,595, filed Jun. 3, 1999.

This invention relates to a method and apparatus for data congestion management in an asynchronous transfer mode (ATM) communication system and more particularly to a method and apparatus for data congestion management in an ATM satellite communication system with processing and switching on board the satellite.

BACKGROUND OF THE INVENTION

Figure 1:
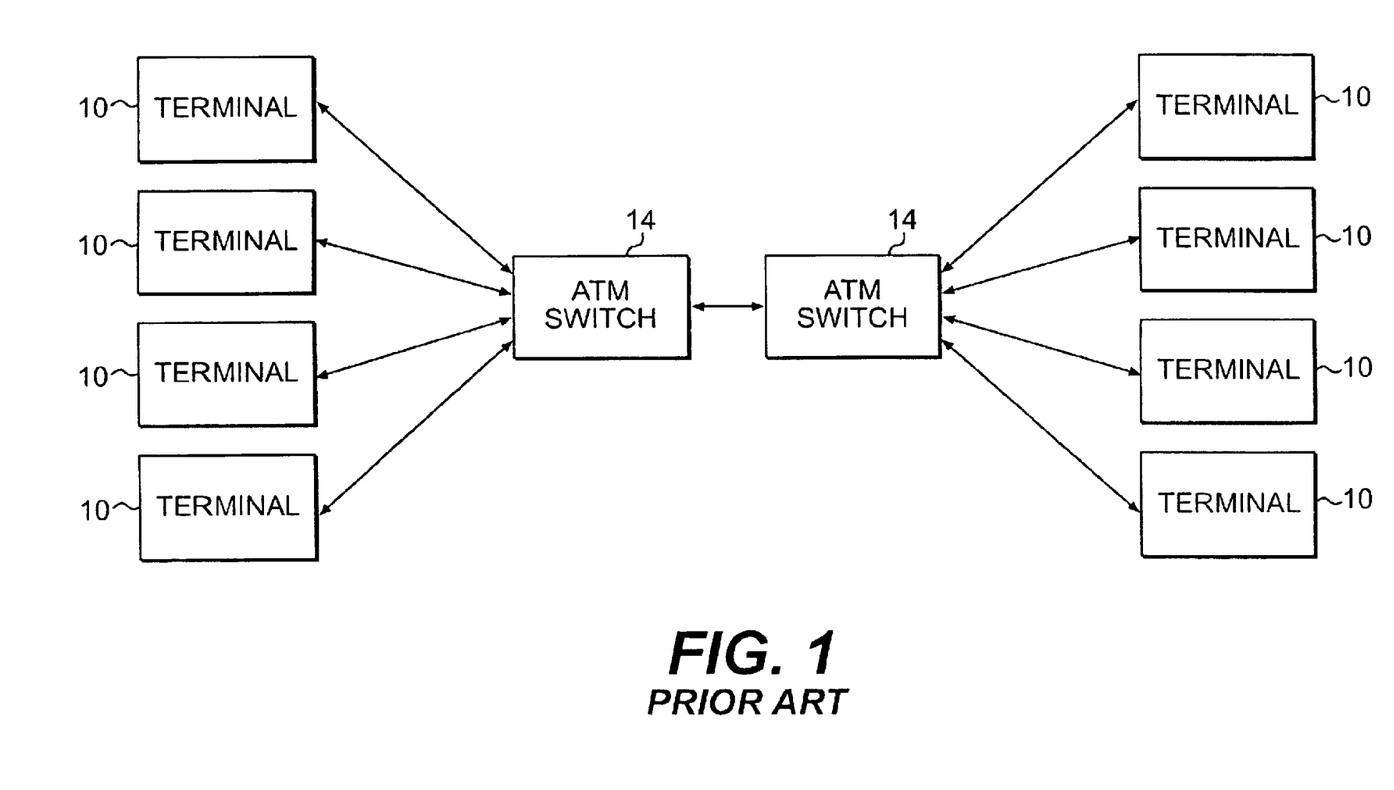
FIG. 1 is a block diagram of an ATM communications system.

In an ATM communication system, data is communicated between terminals over virtual channels in data packets called cells. ATM communication systems are described in the textbook entitled ATM Theory and Application by David McDysan and Darren Spohn, 1999, published by McGraw-Hill. This textbook is hereby incorporated by reference. As shown in FIG. 1, which schematically illustrates a typical ATM communication system, the system comprises a large number of stations or terminals 10 for transmitting and receiving data from each other over virtual channels through ATM switches 14 (hereinafter called simply switches), which include data processors and which can establish virtual channel communication links with each other and with the stations 10. A station 10 transmitting cells over a virtual channel is called a source and a station 10 receiving cells transmitted over virtual channel is called a destination. The switches 14 respond to routing information in the headers of the cells to route the cells over the virtual channel to the correct destination. The virtual channels are designed for different classes of ATM traffic which are identified as constant bit rate (CBR), variable bit rate (VBR), available bit rate (ABR) and unspecified bit rate (UBR). Because both CBR and VBR traffic have a higher priority for communication link bandwidth than ABR traffic, the ABR bandwidth capacity on a data link is that which is available after subtraction of the bandwidth required for the CBR and VBR virtual channels. ATM communication systems are designed to manage the ABR traffic whereby the available bandwidth capacity is distributed among competing ABR sources.

The switches 14 compute an explicit rate (ER) for each ABR virtual channel passing through the switch in accordance with the congestion on the outbound link from the switch. The computed ER, if less than the rate desired or needed by the source terminal, is transmitted back to the source terminal which will then set its transmission rate in accordance with the received ER.

Figure 2:
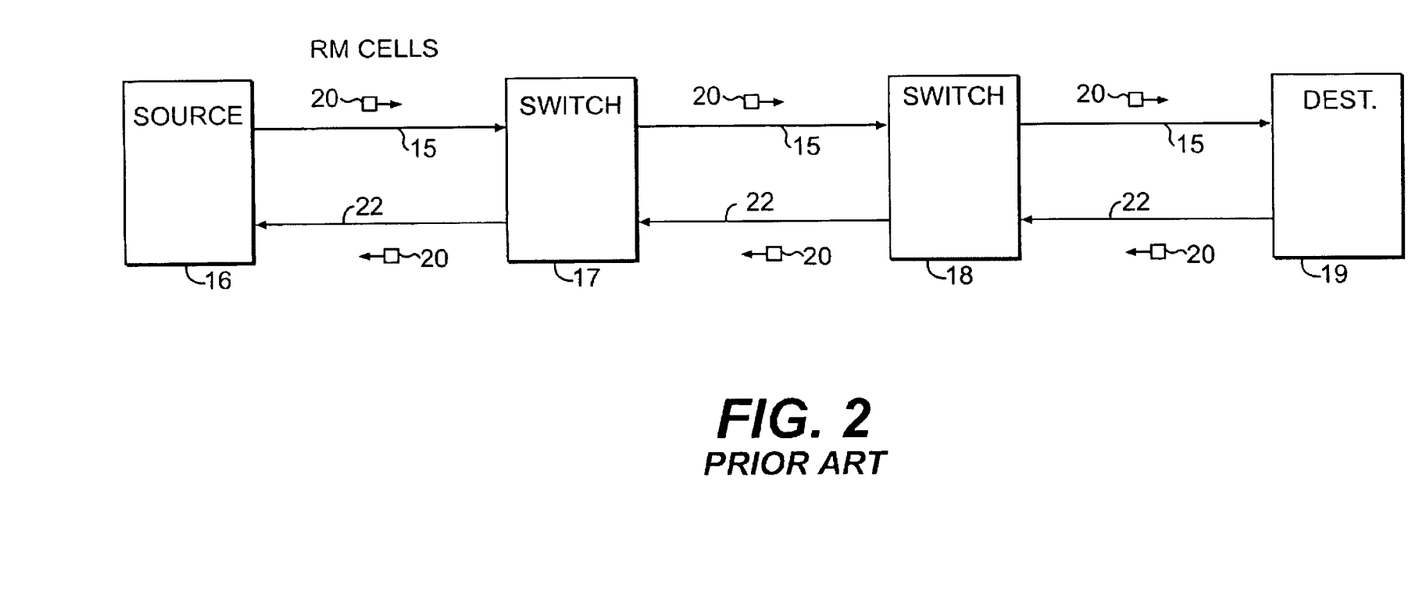
FIG. 2 is a block diagram schematically illustrating how resource management cells are employed in an ATM communication system.

To transmit an ER for a virtual channel back to the virtual channel source, resource management (RM) cells are employed. FIG. 2 schematically illustrates how resource management cells are used in connection with a virtual channel to control the ER. As shown in FIG. 2, a virtual channel 15 extends from a virtual channel source 16 through switches 17 and 18 to a destination 19. The source 16 periodically transmits RM cells 20 over the virtual channel 15 to destination 19 from which the M cells are returned to the originating source 16 over an associated virtual channel 22. The RM cells, like ATM data cells, comprise a header containing routing information by which the RM cells are routed from the source to the destination. In addition, each IM cell will contain a current cell rate (CCR) which is inserted in the RM cell by the source and which indicates the rate at which the source is transmitting cells on the virtual channel. In addition, each RM cells contains an ER which is initially inserted into the RM cell by the source when the RM cell is transmitted on the virtual channel. Each of the switches 17 and 18, computes an ER for the virtual channel based on the congestion on the outbound link from the switch. The switch 17 computes an ER based on the congestion in the link from the switch 17 to the switch 18 and the switch 18 computes an ER based on the congestion in the outbound link from the switch 18. The links between the switches 17 and 18 and between the switch 18 and the destination 19 and other destinations will typically include a large number of virtual channels. The switch 17 compares the calculated ER with the ER in the currently received RM cells, and if the calculated ER is less than the ER in the currently received cell, the switch 17 will update the ER cell with the newly calculated ER. Similarly, if the switch 18 determines an ER which is less than the ER in the currently received RM cell, the switch 18 will update the ER in the RM cell with the newly calculated ER. Then, when the RM cell is circulated back to the source, the source will set its rate in accordance with ER in the M cell. The RM cell is circulated back to the source 16 from the destination 19 through the virtual channel 22 extending from the destination 19 back to the source 16.

An example of an algorithm for computing ER is called ERICA for "Explicit Rate Indicator for Congestion Avoidance" which is described in detail in U.S. Pat. No. 5,633,859 issued May 27, 19987 to Jain et al. This patent is hereby incorporated by reference. Other known algorithms for managing the ABR traffic are EPRCA, CAPC and ER based on demand estimate algorithm.

In accordance with ERICA, the bandwidth capacity available for ABR traffic on a data link is defined as Target ABR Capacity, and is determined as follows:

$$\text{Target ABR Capacity} = \text{target utilization} \times \text{link bandwidth} - \text{VBR bandwidth usage} - \text{CBR bandwidth usage}$$

The target utilization is a fixed parameter close to, but less than, 100 percent, and is usually about 90 percent.

The VBR and CBR usages for a given data link are determined by counting the number of VBR and CBR cells on the data link during a time period called the averaging interval. The load factor z for the data link is calculated by dividing the ABR input rate by the Target ABR Capacity. The ABR input rate is measured by counting the incoming ABR cells to be transmitted over a data link during an averaging interval. A FairShare bandwidth share for each virtual channel on the data link is calculated by dividing the Target ABR Capacity by the number of active ABR sources competing for use of the data link. Another bandwidth share, called VCShare, is calculated by dividing the ABR current cell rate (CCR) on the virtual channel by the load factor z. The CCR is inserted in the RM cell by the source. The calculated ER used to update the ER value in the RM cell is calculated as follows under overload conditions:

$$\text{ER Calculated} = \text{Min}(\text{Max}(\text{FairShare}, \text{VCShare})\text{ Target ABR Capacity})$$

Overload conditions are determined to exist when z is greater than $1+\delta$, in which $\delta$ is a small fixed fraction. In accordance with the above formula for ER calculated, the switch at which the explicit rate is calculated determines the FairShare and VCShare, then selects the one of these two quantities which is greater, and then determines the lesser of the selected FairShare of VCShare and the Target ABR Capacity for the link. The result of this determination becomes the calculated ER under overload conditions. Since the switches can only reduce the explicit rate in the RM cell, the ER is replaced in the RM cell with the newly calculated ER only if it is less than the ER already in the RM cell.

When the load factor z is less than 1+δ, to achieve fairness among the competing ABR virtual channels, the virtual channels in the link are assigned the same allocation equal to maximum allocation assigned during the previous averaging interval, if this allocation is less than the ER Calculated under overload conditions.

In a satellite ATM communication system, a virtual channel will extend from a source terminal in a ground station through an uplink to a switch in a satellite and from the switch in the satellite through a downlink to a destination terminal. The worst data congestion is likely be in the downlink, which typically will serve a large number of ground terminals receiving the downlink. In the prior art ATM satellite communication systems, the switch in the satellite computes the ER for each ABR virtual channel in the downlink and the ER computation requires added power and mass on board the satellite. Since power and mass are at a premium in a satellite, improvements which achieve even small reduction in the mass and power requirements of the satellite are quite valuable and are much sought after. Accordingly, there is a need to carry out the ER computation in a way without adding to the mass of the satellite and without adding to the satellite power requirements.

SUMMARY OF THE INVENTION

In accordance with the present invention, the mass and power required in the satellite of an ATM satellite communication system are reduced by a system design in which the calculations of the ER are carried out at a ground terminal instead of in a switch on board the satellite. This arrangement reduces the processing power required on the satellite and thus reduces the mass and power required in the satellite by shifting much of the required computation from the satellite to a ground terminal. In accordance with the invention, congestion parameters needed to compute the ERs for the ABR virtual channels in the downlink are determined in the satellite and then are broadcast to the round terminals. The ground terminals then use congestion parameters broadcast from the satellite to calculate the ERs for the active ABR virtual channels. Each source of an ABR virtual channel sets its rate of transmission in accordance with the calculated ER if the calculated ER is less than the ER desired by the source.

DESCRIPTION OF A PREFERRED EMBODIMENT

Figure 3:
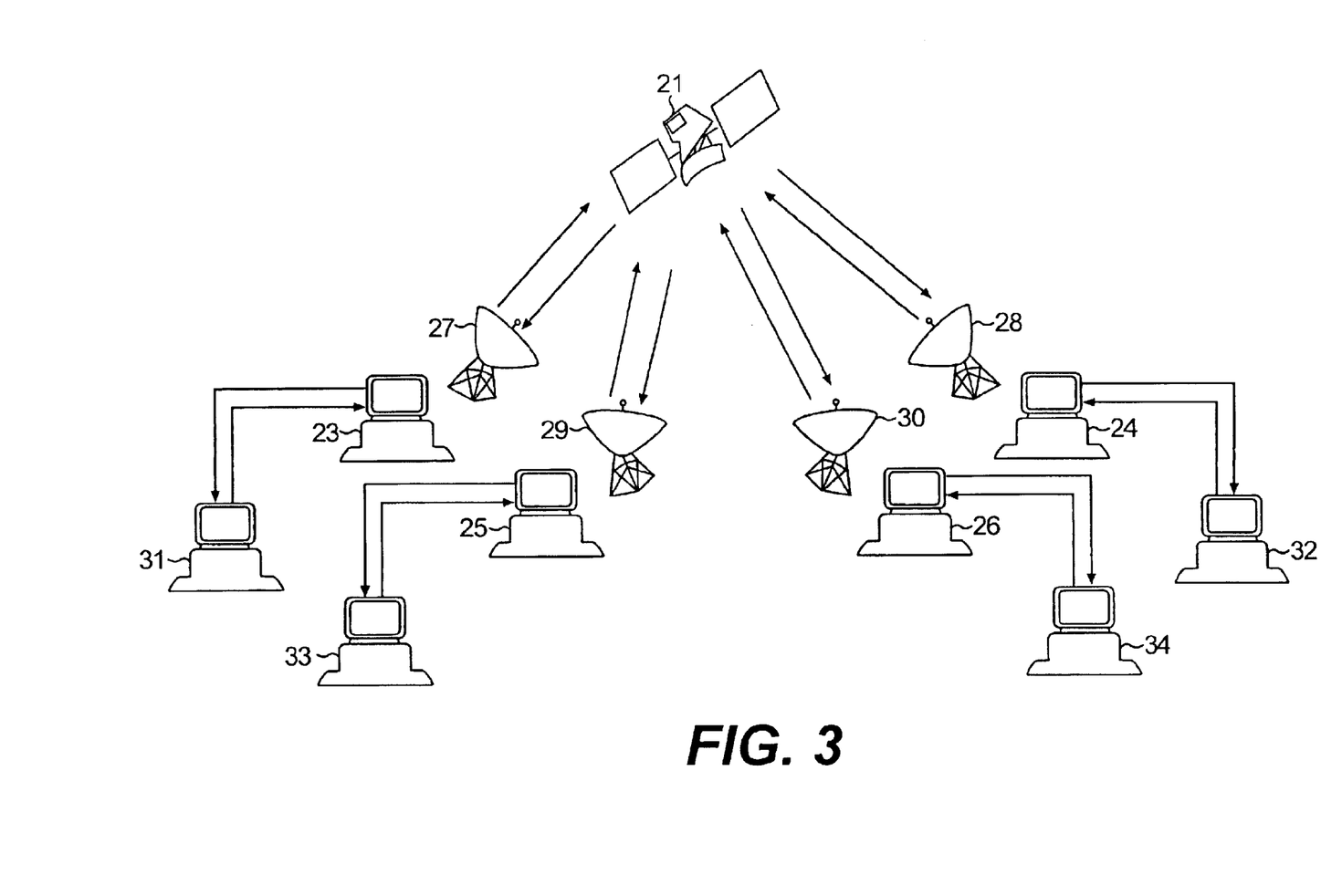
FIG. 3 is a schematic illustration of a satellite communication system in which the present invention is employed.

The ATM satellite communication system in which the present invention is implemented is shown in FIG. 3. As shown in FIG. 3, a satellite 21 communicates with ground stations 23 through 26 via satellite dishes 27 through 30, respectively. The stations 23–26 are representative of a much larger number of such stations, which may communicate with each other via the satellite 21. Each of the stations 23–26 may communicate with one or more external nodes 31 through 34. In the ATM system, the stations 23–26 and the external nodes 31–34 may each serve as a source or a destination for virtual channels. For example, a virtual channel may exist from a source at the station 23 through a switch in the satellite 21 to a destination at station 25. The component of the virtual channel from the station 23 serving as a source to the switch in the satellite 21 will be an uplink. The station transmitting data directly to the satellite is also call an uplink terminal. An uplink terminal may be a source or it may receive data from a source. The component of the virtual channel from the switch in the satellite 21 to the destination at station 25 will be in a downlink in which the satellite will typically communicate through virtual channels to a large number of destinations. The station directly receiving communication from the satellite is also called a downlink terminal. The downlink terminal may be a destination or it may transmit data to a destination.

An interface in a ground station serving as a source will periodically transmit RM cells over a virtual channel to a ground station serving as a destination. The source determines a desired ER and inserts the desired ER in each RM cell. In accordance with a first embodiment of the invention, an ER is calculated at the destination in a manner similar to the ERICA calculation of ER. The ER calculated at the destination replaces the ER in an M cell currently received at the destination, if the calculated ER is less than the ER in the RM cell. The RM cell is then transmitted back to the source of the virtual channel. The source will then use the ER in the received RM cell to govern its rate of transmission.

In order for the destination to calculate the ER, the downlink terminal has to have the CBR usage and the VBR usage in the downlink, the ABR input rate to the downlink and the number of AR type virtual channels existing in the downlink, which number will be equal to the number of currently active ABR sources using the downlink. The switch in the satellite 21 measures parameters to calculate these values and an interface in the satellite broadcasts these measured parameters to all downlink terminal receiving the downlink at the end of each averaging interval. The measured parameters are a count of CBR cells, a count of VBR cells, a count of ABR cells, and a count of new virtual channels during an averaging interval. In addition to the measured parameters, the satellite interface also broadcasts the Target Utilization, the downlink bandwidth, the average interval duration and the value of δ for all downlinks on all downlinks. The Target Utilization, as in ERICA, is a fixed parameter, usually about 90 percent. The value of δ is the same as it is for ERICA, a small fixed fraction. The downlink bandwidth is a known quantity stored in memory in the satellite.

Figure 4:
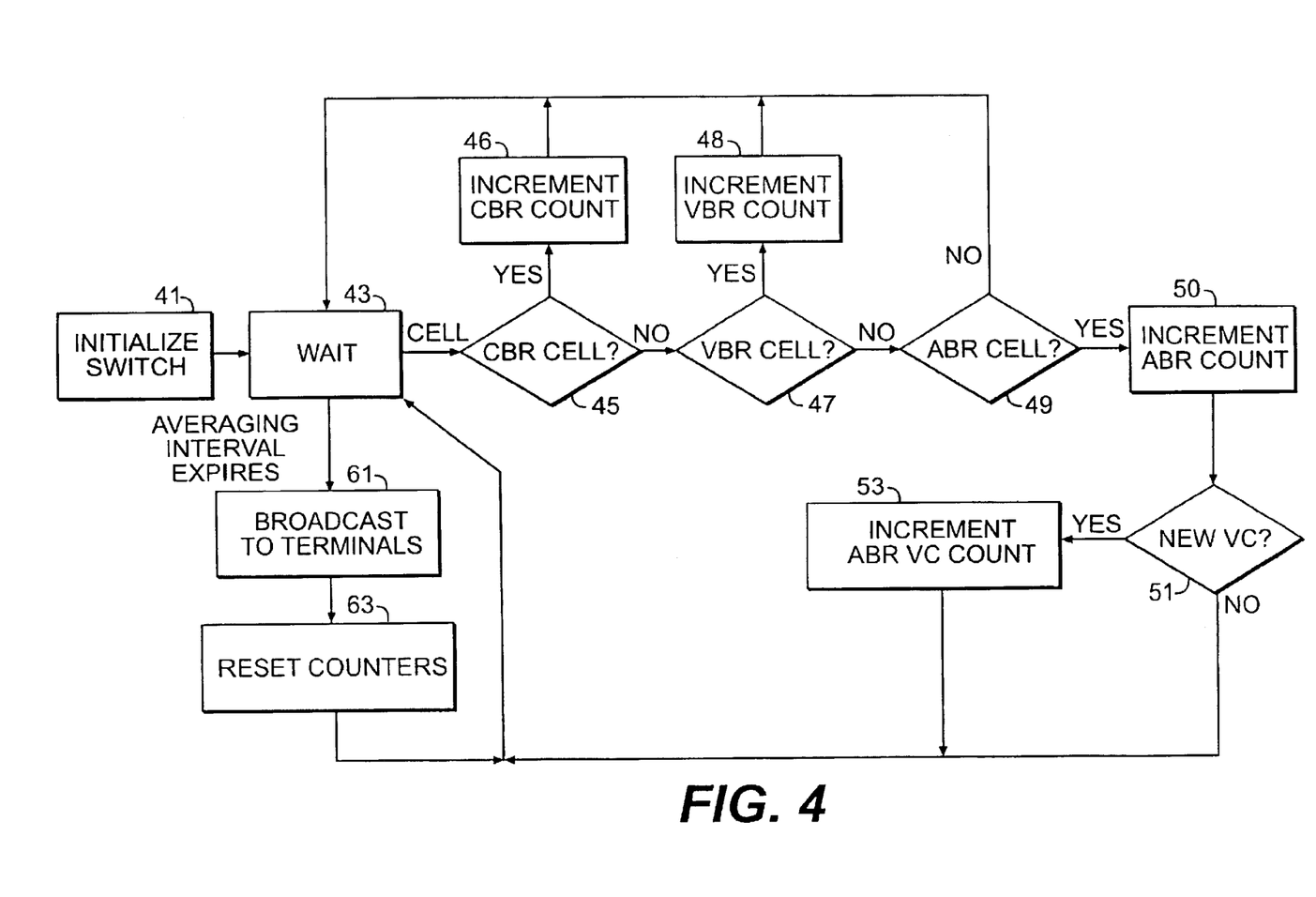
FIG. 4 is a flow chart of the measurement process carried out in a satellite switch in the system of the invention.

FIG. 4 is a flow chart illustrating the measurement by the ATM switch in the satellite of parameters to determine of the CBR usage, the VBR usage, the ABR input cell rate, and the number of active ABR virtual channel sources. As shown in this flow chart, the measurement program, after initializing the switch (step 41), waits for a cell to be received to be transmitted over the downlink and also waits for the averaging interval to expire (step 43). When a cell is received by the switch, the program determines whether or not the cell is a CBR cell (step 45). If the cell is a CBR cell, the program increments the CBR count (step 46) and the program returns to the wait step 43. If the cell is not a CBR cell, the program determines whether or not the cell is a VBR cell (step 47). If the cell is a VBR cell, the program increments the VBR count (step 48) and returns to the wait step 43. If the cell is not a VBR cell, then the program determines whether or not the cell is an ABR cell (step 49). If the cell is not an ABR cell, the program returns to the wait step 43. If the cell is an ABR cell, the program increments the ABR count (step 50). After incrementing the ABR count, the program determines whether or not the received ABR cell is from a new virtual channel source requiring a virtual channel to be established in the downlink (step 51). If the cell is in a new virtual channel, then the program increments the ABR virtual channel count (step 53). Following the processing in steps 51–53, the program returns to the wait step 43 to await receipt of the next cell to be processed. When the averaging interval expires, the CBR count, the VBR count and the ABR count, the ABR virtual channel count, the Target Utilization, the link bandwidth, the average interval duration, and δ are broadcast to all the terminals receiving the downlink from the satellite (step 61). Following step 61, the counters of the CBR count, the VBR count, the ABR count, the ABR virtual charnel count and are reset to zero (step 63), whereupon the program returns to the wait step 43. From the parameters measured by the satellite and broadcast by the satellite to the downlink terminals and from the fixed parameters also broadcast to the downlink terminals, the downlink terminal of each virtual channel computes an ER. To make this calculation, a processor at the downlink terminal first computes the Target ABR Capacity for the downlink as follows:

Target ABR Capacity=Target Utilization×Link Bandwidth−VBR Usage−CBR Usage

VBR usage is determined from the VBR count broadcast down from the satellite and the average interval duration. CBR usage is determined from the CBR count broadcast down from the satellite and the average interval duration. After the Target ABR Capacity is calculated, the downlink terminal processor computes the load factor z as follows:

$$z = \frac{ABR \text{ input rate}}{\text{Target } ABR \text{ Capacity}}$$

The ABR input rate is the ABR cell input rate to the downlink and is determined from the ABR count and the averaging interval duration. Next, the downlink terminal processor computes the FairShare as follows:

$$FairShare = \frac{\text{Target } ABR \text{ Capacity}}{\text{Number of Active } ABR \text{ Sources}}$$

The number of active ABR sources is represented by the ABR virtual channel count broadcast by the satellite. The processor at the destination downlink terminal the VC shares for virtual channel as follows:

$$VCShare = \frac{CCR}{z}$$

The CCR will be registered in each RM cell and the processor reads the CCR from each RM cell and then determines the VC share. The processor then determines if the load factor z is greater than 1+δ indicating that an overload condition exists. If is greater than 1+δ, the processor at the downlink terminal computes the ER calculated as follows:

ER Calculated=Min(Max(FairShare, VCShare)Target ABR Capacity)

If the load factor z is less than 1+δ, the ER is determined as follows:

ER Calculated=Min(Max(FairShare,VCShare)Target ABR Capacity, MaxAllocPrevious)

MaxAllocPrevious is the highest ER determined for all of the virtual channels in the downlink during the previous averaging interval. After determining the ER calculated, the processor at the downlink terminal will update the ER in the current RM cell received b the downlink terminal, if the R calculated is less than the ER in the M cell. The RM cell is then returned to the virtual channel source, which then sets its ABR rate in accordance with the ER in the returned RM cell.

Figure 5:
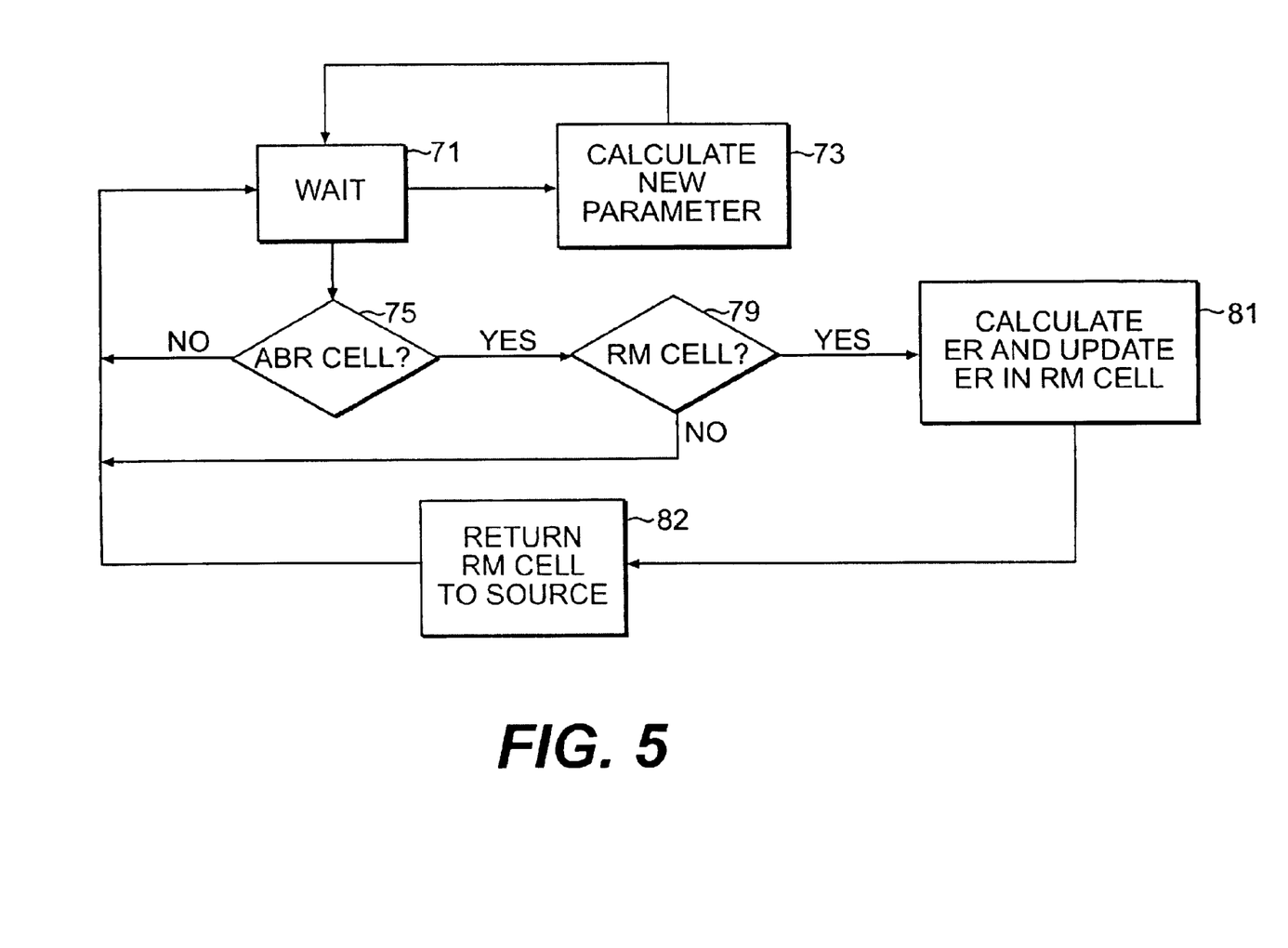
FIG. 5 is a flow chart illustrating the process carried out in the ground terminals in accordance with the present invention to compute the ER for a virtual channel.

FIG. 5 is a flow chart illustrating the process of the calculations performed for a given virtual channel in a downlink terminal on such channel. As shown in this flow chart, the process starts in a wait step 71 in which the process waits for the broadcast of parameters or the receipt of a cell from the satellite. When the broadcast parameters are received, the process branches into step 73 to calculate the load factor z and the FairShare in the same manner that these values are calculated in ERICA. Each time a cell is received on the virtual channel from the satellite, the process proceeds into step 75 in which it is determined whether or not the received cell is an ABR cell. If the received cell is not an ABR cell, the processor returns to the wait step 71. If the received cell is an ABR cell, the process determines whether or not the received cell is an RM cell (step 79). If the received cell is an RM cell, the program calculates the ER as described above (step 81). To make this calculation, first the VCShare has to be calculated from the CCR for the virtual channel which is read from the RM cell. After VCShare is calculated, the ER is calculated from the current values of Target ABR Capacity, load factor, FairShare, VCShare and MaxAllocPrevious as explained above. After the ER has been calculated, the ER in the RM cell is updated with the calculated ER if the calculated ER is less than the ER in the RM cell. Following steps 79 and 81, the RM cell is circulated back to the source (step 82), which controls the transmission rate in accordance with the ER in the received RM cell.

Figure 6:
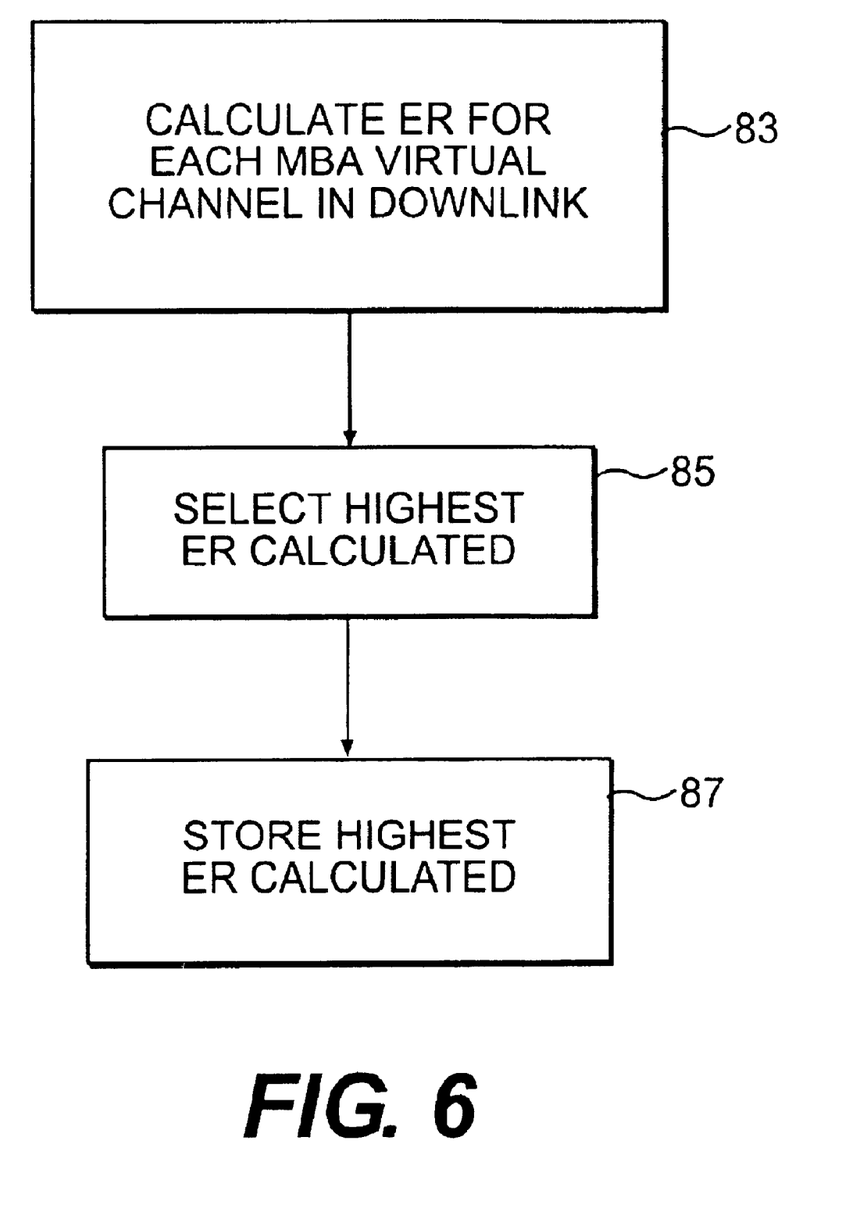
FIG. 6 is a flow chart illustrating a process carried in a ground terminal to compute the maximum ER allocated in the downlink from the satellite.

To calculate MaxAllocPrevious, the downlink terminal follows the process represented by the flow chart of FIG. 6. As shown in FIG. 6, the processor calculates the explicit rate for each virtual channel in the downlink from the satellite (step 83). To make this calculation, the processor in the downlink terminal reads the CCR in all received RM cells including those for the other virtual channels in the downlink. The processor then calculates the VCShare for each virtual charnel in the downlink by dividing CCR by the load factor z. The ER is then calculated for each virtual channel in the downlink as follows if the load factor z is greater than 1+δ:

$ER_n$=Min(Max(FairShare,VCShare$_n$)TargetABRCapacity)

in which $ER_a$ is the ER calculated for virtual channel n and $VCShare_n$, is the VCShare for channel n. If the load factor z is less than 1+δ, then the ER for each virtual channel n is calculated by the processor as follows:

$$ER_n=Min(Max(FairShare, VCShare_n)TargetABRCapacity, MaxAllocPrevious)$$

After calculating the $ER_n$ for each virtual channel, the processor selects the highest $ER_n$ calculated (step 85), and then stores this value (step 87) to be used as the MaxAllocPrevious in the next averaging interval.

The calculation of MaxAllocPrevious may not be practical in some applications in which case the ER is determined in accordance with:

$$ER=Min(Max(FairShare, VCShare)Target\ ABR\ Capacity)$$

regardless of the value of the load factor.

In the above-described embodiments, the CBR usage and the VBR usage in the downlink is calculated in the satellite switch. Alternatively, these values can be calculated in the downlink terminal to further reduce the computation in the satellite.

In the above-described system, the satellite transmits the congestion information for a given downlink to the downlink terminals. The receiving downlink terminals then set the explicit rate in the RM cells which are then routed back to the virtual channel sources. The performance can be improved if the congestion feedback reaches the virtual channel source sooner. In accordance with a second embodiment of the invention, the congestion parameters for each downlink are broadcast for every downlink on all of the downlinks to every uplink and downlink terminal. This enables the uplink terminals, instead of the downlink terminals, to process the congestion statistics and calculate the explicit rate to be used by each virtual channel source to determine the rate of ABR transmission by such virtual source. If the uplink terminal is not the source of the virtual channel, the uplink terminal transmits the calculated ER to the source in an RM cell being circulated back to the source on the associated virtual channel extending from the destination back to the source. The uplink terminals cannot calculate MaxAllocPrevious so in this embodiment, the ER for each virtual channel is calculated without using MaxAllocPrevious in the same manner as described above for downlink terminals in which it is not practical to calculate MaxAllocPrevious. Each source after calculating its ER for its virtual channel, then transmits ABR cells at the calculated ER. This embodiment can be used when the number of downlink beams from the satellite is not excessive.

The invention as described above is designed to reduce the mass and power requirements in a satellite in an ATM communication system. The invention is also applicable to other ATM communication system in which there is a need to reduce the mass and power requirements in an intermediate station housing a switch controlling the transmission on an outbound link from said intermediate station. The invention has particular application in ATM communication systems in which the outbound link for the intermediate station is a radio link, which facilitates the broadcasting of the measured parameters to virtual channel terminals.

Although specific embodiments have been disclosed herein, it will be appreciated by those of ordinary skill in the art that any arrangement which is calculated to achieve the same purpose may be substituted for the specific embodiments disclosed.

What is claimed is:

1. In a satellite data transmission system for transmitting data between ground stations, a method of controlling the bandwidth on a virtual channel carrying available bit rate (ABR) data, said virtual channel extending from a source comprising a ground station to a destination comprising another ground station through a satellite downlink, comprising:

measuring the parameters of the data traffic on said satellite downlink, computing at one of said ground stations a calculated explicit rate for cell transmission on said virtual channel from said parameters, and controlling the rate of cell transmission on said virtual channel in accordance with said calculated explicit rate.

2. A method as recited in claim 1, wherein said parameters include a measurement of the constant bit rate bandwidth usage of said downlink, a measurement of the variable bit rate bandwidth usage of said downlink, and a measurement of the ABR input rate to said downlink from said satellite.

3. A method as recited in claim 2, wherein said one of said ground stations computes the explicit rate by computing a Target ABR Capacity by multiplying a predetermined fraction times the downlink bandwidth and subtracting the VBR bandwidth usage and the CBR bandwidth usage of said downlink, by computing a load factor by dividing the ABR cell input rate to said downlink by the Target ABR Capacity, by computing a FairShare by dividing the Target ABR Capacity by the number of active ABR sources having a virtual channel in said downlink, by computing a VCShare by dividing the current cell rate on said virtual channel by said load factor and determining the calculated explicit rate from the algorithm:

min(max(FairShare, VCShare), Target ABR Capacity).

4. A method as recited in claim 2, wherein one of said ground stations computes the explicit rate for a current averaging interval by computing a Target ABR Capacity by multiplying a predetermined fraction times the downlink bandwidth and subtracting the VBR bandwidth usage and the CBR bandwidth usage of said downlink during said current averaging interval, by computing a load factor by dividing the ABR cell input rate to said downlink by the Target ABR Capacity, by computing a FairShare by dividing the Target ABR Capacity by the number of active ABR sources having a virtual channel in said downlink, by computing a VCShare by dividing the current cell rate on said virtual channel by said load factor and determining the calculated explicit rate from the algorithm:

min(max(FairShare, VCShare), Target ABR Capacity, MaxAllocPrevious)

in which MaxAllocPrevious is the Maximum explicit rate for all of the ABR virtual channels in the downlink during an averaging interval preceding the current averaging interval.

5. A method as recited in claim 1, wherein said satellite broadcasts said parameters to a plurality of ground stations including said one of said ground stations.

6. A method as recited in claim 1, wherein said one of said ground stations comprises a downlink terminal on said virtual channel.

7. A method as recited in claim 6, wherein said parameters are measured in said satellite and said satellite broadcasts said parameters to all the ground stations receiving said downlink including said one of said ground stations.

8. A method as recited in claim 1, wherein said calculated explicit rate is calculated at an uplink terminal on said virtual channel.

9. A method as recited in claim 8, wherein parameters are measured in said satellite and said satellite broadcasts said parameters to all the ground stations linked with said satellite by an ABR virtual channel.

10. A method as recited in claim 1, wherein said source determines a desired explicit rate and transmits data on said virtual channel at the lesser of said desired explicit rate and said calculated explicit rate.

11. A method as recited in claim 10, wherein said desired explicit rate is inserted in a resource management cell transmitted to said destination and then circulated back to said source, a downlink terminal determining a calculated explicit rate from said parameters and replacing the explicit rate in said resource management cell with said calculated explicit rate if said calculated explicit rate is less than the explicit rate in said resource management cell.

12. In a data transmission system for transmitting data between terminals, a method of controlling the bandwidth on a virtual channel carrying Available Bit Rate (ABR) data, through an intermediate station and through an outbound link from said intermediate station comprising:

measuring parameters of the data traffic on said outbound link in said intermediate station, transmitting said parameters from said intermediate station to a terminal on said virtual channel, computing at said terminal on said virtual channel a calculated explicit rate for cell transmission on said virtual channel from said parameters, and controlling the rate of cell transmission on said virtual channel in accordance with said calculated explicit rate.

13. A data transmission system as recited in claim 12, wherein said parameters are transmitted from said intermediate station by broadcasting said parameters to a plurality of terminals linked to said intermediate station by said outbound link.

14. A method as recited in claim 12, wherein said explicit rate is computed at terminal receiving said outbound link.

15. A method as recited in claim 12, wherein said explicit rate is computed by computing a Target ABR Capacity by multiplying a predetermined fraction times the bandwidth of said outbound link and subtracting the VBR bandwidth usage and the CBR bandwidth usage of said outbound link by computing a load factor by dividing the ABR cell input rate to said outbound link by said Target ABR Capacity, by computing a FairShare by dividing the Target ABR Capacity by the number of active ABR sources having a virtual channel in said outbound link, by computing a VCShare by dividing the current cell rate on said first-mentioned virtual channel by said load factor and determining the calculated explicit rate from min(max(FairShare, VCShare), Target ABR Capacity).

16. A method as recited in claim 12, wherein said explicit rate is computed by computing a Target ABR Capacity by multiplying a predetermined fraction times the bandwidth of said outbound link and subtracting the VBR bandwidth usage and the CBR bandwidth usage of said outbound link, by computing a load factor by dividing the ABR cell input rate to said outbound link by the Target ABR Capacity, by computing a FairShare by dividing the Target ABR Capacity by the number of active ABR sources having a virtual channel in said outbound link, by computing a VCShare by dividing the current cell rate on said first mentioned virtual channel by said load factor and determining the calculated explicit rate from min(max(FairShare,-VCShare), Target ABR Capacity, MaxAllocPrevious) in which MaxAllocPrevious is the maximum explicit rate for all the ABR virtual channels in said outbound link during an averaging interval preceding said current averaging link.

17. A method as recited in claim 12, wherein said calculated explicit rate is calculated at a terminal on said virtual channel transmitting data on said virtual channel to said intermediate station.

18. A method as recited in claim 17, wherein said intermediate station broadcasts said parameters to all the terminals directly linked with said intermediate station by an ABR virtual channel.

19. A method as recited in claim 12, wherein a source for said virtual channel determines a desired explicit rate and transmits data on said virtual channel at the lesser of said desired explicit rate and said calculated explicit rate.

20. A method as recited in claim 19, wherein said desired explicit rate is inserted in a resource management cell transmitted to a destination for said virtual channel and then circulated back to said source, a terminal on said virtual channel receiving said outbound link determining a calculated explicit rate from said parameters and replacing the explicit rate in said resource management cell with said calculated explicit rate if said calculated explicit rate is less than the explicit rate in said resource management cell.

21. An asynchronous transfer mode data transmission system comprising:

a satellite, a plurality of ground stations, a plurality of virtual channels extending from a plurality of sources in said ground stations through said satellite and through a downlink from said satellite to a plurality of destinations in said ground stations, each of said virtual channels transmitting data from a source to a destination, a processor in said one of said ground stations computing an explicit rate for one of said virtual channels linking said one of said ground stations with another of said ground stations through said downlink, said processor computing said explicit rate from parameters of data congestion of said downlink, the source of said one of said virtual channels transmitting data on said one of said virtual channels in accordance with said calculated explicit rate.

22. An asynchronous transfer mode data transmission system as recited in claim 21, wherein a processor in said satellite measures said parameters of said data congestion and transmits said parameters to said one of said ground stations.

23. A data transmission system as recited in claim 22, wherein an interface in said satellite broadcasts said parameters to all of said ground stations receiving said downlink.

24. A data transmission system as recited in claim 21, wherein said parameters include measurements of VBR usage, which is the bandwidth of variable bit rate data traffic on said downlink, CBR usage, which is the bandwidth of the constant bit rate traffic on said downlink, the ABR input rate, which is the ABR cell input rate to said downlink and number of active ABR sources, said processor calculating Target ABR Capacity in accordance with:

Target ABR Capacity=Target Utilization×Downlink Bandwidth− CBR Usage−VBR Usage in which Target Utilization is a predetermined fraction, said processor calculating load factor (z) in accordance with:

$$z = \frac{ABR \text{ input rate}}{\text{Target } ABR \text{ Capacity}}$$

said processor calculating FairShare in accordance with:

$$FairShare = \frac{\text{Target } ABR \text{ Capacity}}{\text{number of Active } ABR \text{ sources}}$$

said processor calculating VCShare in accordance with:

$$VCShare = \frac{CCR}{z}$$

in which CCR is the current cell rate of transmission in said one of said virtual channels, said processor calculating said explicit rate in accordance with:

ER=min(max(FairShare, VCShare) Target A BR Capacity).

25. A data transmission system as recited in claim 21, wherein said parameters include measurements of VBR usage, which is the bandwidth of variable bit rate data traffic on said downlink during a current interval, CBR usage, which is the bandwidth of the constant bit rate traffic on said downlink during said current interval, the ABR input rate, which is the ABR cell input rate to said downlink during said current interval, and number of active ABR sources during said current interval, said processor calculating Target ABR Capacity in accordance with:

Target ABR Capacity=Target Utilization×Downlink Bandwidth−CBR Usage−VBR Usage in which Target Utilization is a predetermined fraction, said processor calculating load factor (z) in accordance with:

$$z = \frac{ABR \text{ input rate}}{\text{Target } ABR \text{ Capacity}}$$

said processor calculating FairShare in accordance with:

$$FairShare = \frac{\text{Target } ABR \text{ Capacity}}{\text{number of Active } ABR \text{ sources}}$$

said processor calculating VCShare in accordance with:

$$VCShare = \frac{CCR}{z}$$

in which CCR is the current cell rate of transmission in said one of said virtual channels, said processor calculating said explicit rate in accordance with:

ER=min(max(FairShare, VCShare)Target ABR Capacity,MaxAllocPrevious)

in which MaxAllocPrevious is the maximum explicit rate for all of the ABR channels in said downlink during an interval preceding said current interval.

26. A data transmission system as recited in claim 21, wherein said processor is at a ground station receiving said downlink.

27. A data transmission system as recited in claim 21, wherein the source of said one of said virtual channels determines a desired explicit rate for transmitting data on said one of said virtual channels, the source of said one of said virtual channels inserting said desired explicit rate into a resource management cell and sending said resource management cell to the destination for said one of said virtual channels, said processor replacing the explicit rate in said resource management cell with the explicit rate calculated if the explicit rate calculated is less than the explicit rate in the resource management cell currently received by the destination of said one of said virtual channels.

28. A data transmission system as recited in claim 21, wherein said processor is at a ground station transmitting data to said satellite through an uplink.

29. A data transmission system as recited in claim 28, wherein a processor in said satellite computes said parameters and an interface in said satellite broadcasts said parameters to all of said ground stations directly linked to said satellite by an uplink or a downlink.

30. An asynchronous transfer mode data transmission system comprising a satellite, a plurality of terminals, an intermediate station, a plurality of virtual channels extending from a plurality of sources in said terminals through said intermediate station and through an outbound link from said intermediate station to a plurality of destinations in said terminals, each of said virtual channels transmitting data from a source to destination, a processor in a first one of said terminals determining an explicit rate for one of said virtual channels, said processor determining said explicit rate from parameters of data congestion on said outbound link, the source of said one of said virtual channels transmitting data on said one of said virtual channels in accordance with said calculated explicit rate.

31. An asynchronous transfer mode data transmission system as recited in claim 30, wherein a processor in said intermediate station measures said parameters and transmits said parameters to said one of said terminals.

32. A data transmission system as recited in claim 30, wherein said parameters include measurements of VBR usage, which is the bandwidth of variable bit rate data traffic on said outbound link, CBR usage, which is the bandwidth of the constant bit rate traffic on said outbound link, the ABR input rate, which is the ABR cell input rate to said outbound link and number of active ABR sources, said processor calculating Target ABR Capacity in accordance with:

Target ABR Capacity=Target Utilization×Outbound Link Bandwidth−CBR Usage−VBR Usage in which Target Utilization is a predetermined fraction, said processor calculating load factor (z) in accordance with:

$$z = \frac{ABR \text{ input rate}}{\text{Target } ABR \text{ Capacity}}$$

said processor calculating Fairshare in accordance with:

$$FairShare = \frac{\text{Target } ABR \text{ Capacity}}{\text{number of Active } ABR \text{ sources}}$$

said processor calculating VCShare in accordance with:

$$VCShare = \frac{CCR}{z}$$

in which CCR is the current cell rate of transmission in said one of said virtual channels and said processor calculating said explicit rate in accordance with:

ER min(max(FairShare, VCShare) Target ABR Capacity).

33. A data transmission system as recited in claim 30, wherein said parameters include measurements of VBR usage, which is the bandwidth of variable bit rate data traffic on said outbound link during a current interval, CBR usage, which is the bandwidth of the constant bit rate traffic on said outbound link during said current interval, the ABR input rate, which is the ABR cell input rate to said outbound link during said current interval, and number of active ABR sources during said current interval, said processor calculating Target ABR Capacity in accordance with:

Target ABR Capacity=Target Utilization×OutboundLink Bandwidth−CBR Usage−VBR Usage in which Target Utilization is a fraction, said processor calculating load factor (z) in accordance with:

$$z = \frac{ABR \text{ input rate}}{Target\ ABR\ Capacity}$$

said processor calculating FairShare in accordance with:

$$FairShare = \frac{Target\ ABR\ Capacity}{\text{number of Active } ABR \text{ sources}}$$

said processor calculating VCShare in accordance with:

$$VCShare = \frac{CCR}{z}$$

in which CCR is the current cell rate of transmission in said one of said virtual channels, and said processor calculating said explicit rate in accordance with:

ER=min(max(FairShare, VCShare) Target ABR Capacity)

when said load factor is greater than 1+a small fraction, said processor determining said explicit rate when the load factor is less than 1+predetermined fraction as follows:

ER=Min(Max(FairShare, VCShare)Target ABR Capacity,MaxAllocPrevious)

in which the MaxAllocPrevious is the maximum explicit rate during an interval preceding said current interval.

34. A data transmission system as recited in claim 30, wherein said processor is at a terminal receiving said outbound link.

35. A data transmission system as recited in claim 34, wherein a processor in said intermediate station measures said parameters and broadcasts said parameters to all of said terminals receiving said outbound link.

36. A data transmission system as recited in claim 34, wherein the source of one of said virtual channels determines a desired explicit rate for transmitting data on said one of said virtual channels, the source of said one of said virtual channels inserting said desired explicit rate into a resource management cell and sending said resource management cell to the destination for said one of said virtual channels, said processor replacing the explicit rate in said resource management cell with the explicit rate calculated if the explicit rate calculated is less than the explicit rate in the resource management cell currently received by the destination of said one of said virtual channels.

37. A data transmission system as recited in claim 30, wherein said processor is at a terminal transmitting data to said intermediate station.

38. A data transmission system as recited in claim 37, wherein a processor in said intermediate station measures said parameters and broadcasts said parameters to all of said terminals directly linked to said intermediate station by a virtual channel.

* * * * *